(12) United States Patent
Chevalier et al.

(10) Patent No.: US 10,762,091 B2
(45) Date of Patent: Sep. 1, 2020

(54) INTERACTIVE FEEDBACK FOR CHANGES IN SEARCH RELEVANCY PARAMETERS

(71) Applicant: salesforce.com, inc., San Francisco, CA (US)

(72) Inventors: Pierre-Yves Chevalier, Biviers (FR); Cyrille Roy, Laval (FR)

(73) Assignee: salesforce.com, inc., San Francisco, CA (US)

( * ) Notice: Subject to any disclaimer, the term of this patent is extended or adjusted under 35 U.S.C. 154(b) by 840 days.

(21) Appl. No.: 14/663,877

(22) Filed: Mar. 20, 2015

(65) Prior Publication Data
US 2016/0070705 A1   Mar. 10, 2016

Related U.S. Application Data (60) Provisional application No. 62/047,412, filed on Sep. 8, 2014.

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC ........... G06F 17/3053; G06F 17/30554; G06F 16/24578; G06F 16/248
USPC ........................................................ 707/728
See application file for complete search history.

(56) References Cited

U.S. PATENT DOCUMENTS

| | | | | |
|---|---|---|---|---|
| 6,401,084 B1 * | 6/2002 | Ortega | ................ | G06F 17/2725 704/5 |
| 6,484,162 B1 * | 11/2002 | Edlund | ............. | G06F 17/30395 707/704 |
| 6,654,749 B1 * | 11/2003 | Nashed | ............. | G06F 17/30864 707/706 |
| 8,041,710 B2 * | 10/2011 | He | .................... | G06F 17/30867 707/722 |
| 8,166,026 B1 * | 4/2012 | Sadler | ............... | G06F 17/30867 707/722 |
| 8,918,328 B2 * | 12/2014 | Plachouras | ........ | G06Q 30/0256 705/14.47 |

(Continued)

OTHER PUBLICATIONS

Algorithms—Inside Search, Google—http://www.google.com/insidesearch/howsearchworks/algorithms.html, data from 2012, 6 pages. [Retrieved Mar. 9, 2015].

*Primary Examiner* — Shahid A Alam
(74) *Attorney, Agent, or Firm* — Kowert, Hood, Munyon, Rankin & Goetzel, P.C.

(57) ABSTRACT

Techniques are disclosed relating to providing interactive feedback based on changes in search parameters. A computing system may receive user input specifying adjustment of a relevancy parameter from a first value to a modified value. The relevancy parameter may be usable to determine ordering of results for search queries. In response to the input, the system may cause information to be displayed that indicates a value of a search metric, and the value may be based on one or more prior search queries using the adjusted relevancy parameter. The system may additionally or alternatively cause first and second sets of ordered search results to be displayed, where the first set is based on the first value of the relevancy parameter and the second set is based on the modified value of the relevancy parameter.

16 Claims, 8 Drawing Sheets

*700*

Receive user input specifying adjustment of a relevancy parameter from a first value to a modified value, where the relevancy parameter is usable to determine ordering of results for search queries
*710*

Cause first and second sets of ordered search results to be displayed for a particular search query, where the first set is ordered based on the first value and the second set of ordered results is ordered based on the modified value
*720*

(56) References Cited

U.S. PATENT DOCUMENTS

| | | | | |
|---|---|---|---|---|
| 9,111,041 | B1 * | 8/2015 | Zhang | G06F 11/3688 |
| 9,501,575 | B2 * | 11/2016 | Serdyukov | G06F 17/30864 |
| | | | | 707/723 |
| 9,652,541 | B1 * | 5/2017 | Amacker | G06F 17/30398 |
| | | | | 707/758 |
| 2004/0236736 | A1 * | 11/2004 | Whitman | G06F 17/30448 |
| | | | | 707/704 |
| 2008/0195960 | A1 * | 8/2008 | Bostock | G06F 3/0485 |
| | | | | 715/767 |
| 2009/0070301 | A1 * | 3/2009 | McLean | G06F 16/30 |
| | | | | 707/999.003 |
| 2009/0106221 | A1 * | 4/2009 | Meyerzon | G06F 17/30864 |
| | | | | 707/999.005 |
| 2011/0145225 | A1 * | 6/2011 | Parikh | G06F 17/30867 |
| | | | | 707/722 |
| 2011/0196864 | A1 * | 8/2011 | Mason | G06F 3/0416 |
| | | | | 707/728 |
| 2015/0026145 | A1 * | 1/2015 | Prakash | G06F 17/30401 |
| | | | | 707/706 |
| 2015/0026153 | A1 * | 1/2015 | Gupta | G06F 17/30336 |
| | | | | 707/711 |

* cited by examiner

INTERACTIVE FEEDBACK FOR CHANGES IN SEARCH RELEVANCY PARAMETERS

This application claims the benefit of U.S. Provisional Application No. 62/047,412, filed on Sep. 8, 2014, which is incorporated by reference herein in its entirety.

BACKGROUND

Technical Field

This disclosure relates to search systems and more particularly to providing feedback based on changes in search parameters.

Description of the Related Art

Search systems typically use relevancy parameters to determine how query results are ordered. Relevancy parameters may specify relative weights to assign to characteristics of elements being searched such as how recently the elements were updated, matches in particular fields, etc. It may be difficult for an administrator of a search system to determine, however, the impact that adjustments in relevancy parameters will have without waiting for users to perform subsequent queries. Further, a change in a relevancy parameter that favorably impacts the ordering of returned results for one query may negatively impact the ordering of returned results for other queries. If a search system administrator changes relevancy parameters, these negative impacts may not be understood until after the new parameters have been deployed into a production system. Therefore, techniques to quickly provide feedback to search system administrators regarding the impact of changes in relevancy parameters and/or other search parameters are desired.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1:
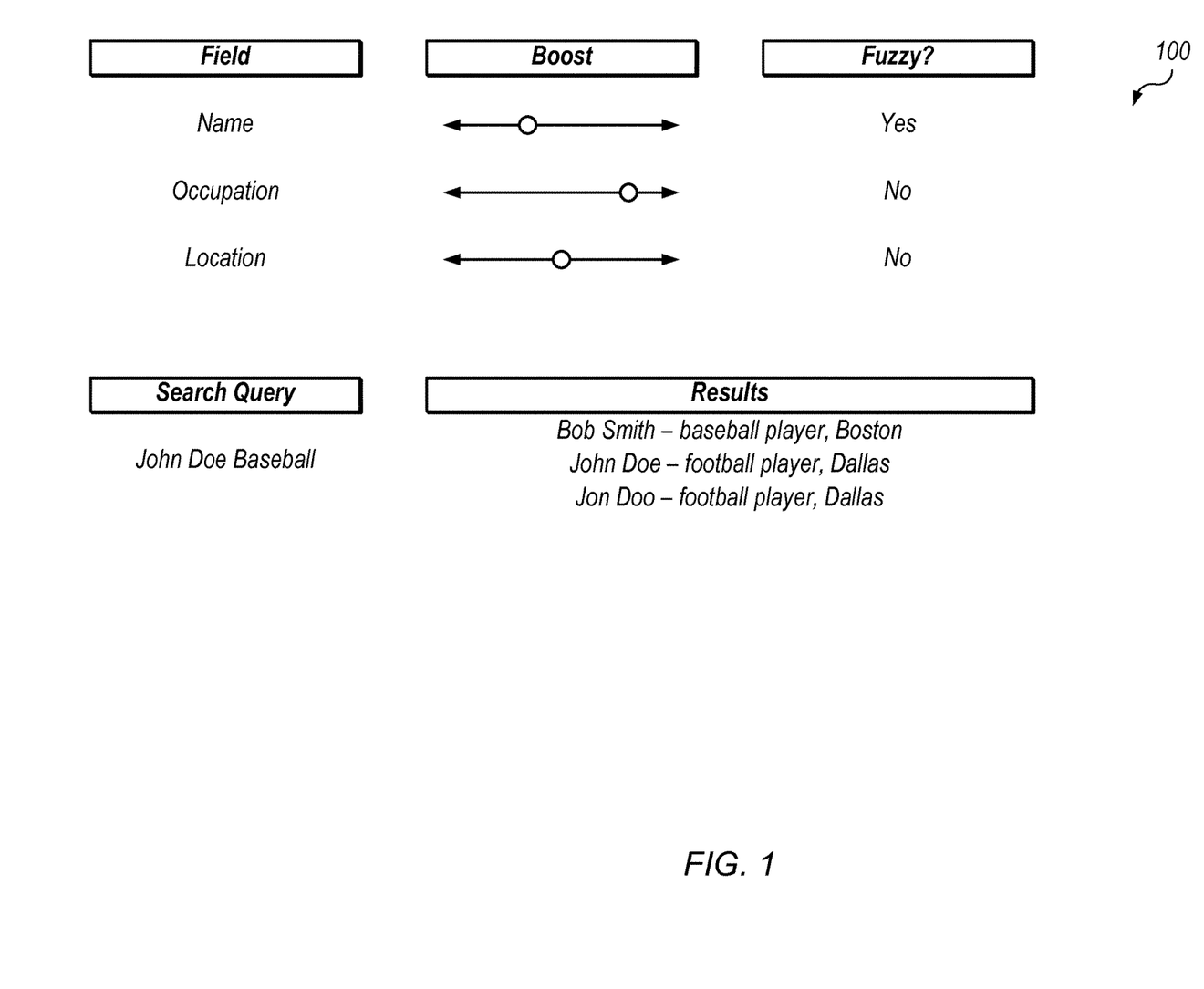
FIG. 1 is a diagram illustrating an exemplary search profile feedback dashboard, according to some embodiments.

This disclosure initially describes, with reference to FIG. 1, embodiments of a search profile feedback user interface that provides feedback, including, for example, real-time feedback regarding ordering of search result based on adjustment of relevancy parameters. It then describes, with reference to FIGS. 2-5C, embodiments of a user interface that provide feedback regarding various search metrics for past queries using updated search parameters. Additional exemplary queries, results, methods, and systems are discussed with reference to FIGS. 6-9. In various embodiments, the disclosed techniques may allow a search system administrator to quickly determine various impacts of adjusted search parameters before deploying the adjusted search parameters on a search system.

Exemplary Feedback Dashboards

FIG. 1 shows an exemplary search profile feedback dashboard 100, according to some embodiments. In the illustrated embodiment, the dashboard is a graphical user interface (GUI) that allows a user to adjust various search parameters. In various embodiments, the dashboard is generated by a computing system executing program instructions for the dashboard. "Dashboard" is being used here according to its ordinary meaning, which includes a user interface that presents information in an easy-to-read fashion; the term is in no way intended to limit the type of user interface which may be presented according to this disclosure. In the illustrated embodiment, a data store to be searched is a database of athlete profiles, and includes the following exemplary fields: name, occupation, and location. In the illustrated embodiment, three results are returned from the database for the search query "John Doe Baseball."

As used herein the term "data store" refers to one or more computer-accessible storage elements that store data. The storage elements of a given data store may be included in or coupled to the same computing system or different computing systems. In various disclosed embodiments, data in data stores is searchable, e.g., directly or using index information for the data. Examples of data stores include, without limitation: databases, file systems, full-text index, email storage systems, web servers, etc.

The boost parameters, in the illustrated embodiment, are configurable by a user of dashboard 100 (e.g., a search system administrator) to adjust weighting factors that specify the relative weight given to different fields in determining the relevancy of search results. In the illustrated embodiment, slidable graphics elements are usable to adjust the boost parameters for the different fields, but in other embodiments, any of various input methods may be used to adjust weighting factors (e.g., explicit entry of values, rotatable graphics, etc.). In some embodiments, the weighting factors may be normalized, e.g., to be adjustable from 0% to 100%. In other embodiments, any of various appropriate values may be used. In some embodiments, one or more search systems associated with the dashboard are configured to utilize the weighting factors to determine ordering of query results. (An exemplary search system is discussed below with reference to FIG. 5C). For example, the system may rank results that match fields with a higher boost value more highly than results that match fields with a lower boost values. In the illustrated example, because the adjusted relevancy parameters specify a higher boost value for the occupation field than the name field, "Bob Smith" is ranked more highly than "John Doe" in the ordered results, because Bob matches the occupation field (as a baseball player) while John does not.

The fuzzy parameters, in the illustrated embodiment, indicate whether fuzzy search logic is utilized for a given field (e.g., as opposed to requiring an exact match). In some embodiments, the search system may implement any of various fuzzy logic algorithms to determine when a field matches a query when there is not an exact match. For example, in the illustrated embodiment, because fuzzy matching is enabled for the name field, the query "John Doe Baseball" returns a result with "Jon Doo" in the name field. Any fuzzy search logic technique may be used within the context of the present disclosure.

In the illustrated example, the boost parameters are used to assign weights to matches on particular fields within the database being searched. In other embodiments, additional parameters may also be used to order search results, including parameters that do not directly correspond to whether the search query matches a particular database field. In some embodiments, for example, a freshness parameter (not shown) is user-adjustable to alter the weight given to search results based on how recently they were added or updated in the database or data store. In other embodiments, any of various additional search parameters may be user-adjustable via the displayed dashboard. Note that various disclosed embodiments utilize a database, but in other embodiments the disclosed techniques may be utilized for any of various appropriate data stores.

Using the illustrated dashboard, a user may adjust relevancy parameters (e.g., using the boost sliders) and/or other search parameters (e.g., using the fuzzy logic selectors). In the illustrated embodiment, search results are displayed in real-time and the dashboard may reorder the results based on changes in parameters. "Real-time" in this context means that feedback is provided quickly in response to user input, within at most 5 seconds. In some embodiments, feedback is provided within 1, 2, or 4 seconds, or within up to 1 minute or 2 minutes for larger sample sizes, especially if re-indexing of sample content is performed, for example. The search query may be user-specified or may be selected or suggested by the dashboard (e.g., randomly, based on a determination that a particular query is common within the relevant computing environment, etc.). Making these adjustments may allow a user to determine the impact of changes in search parameters quickly without deploying the adjusted parameters on a production search system.

Broadly speaking, the present disclosure concerns providing a user interface that permits adjustment of search parameters to gauge the effects on the resulting set of search effects. As used herein, the term "search parameter" broadly refers, for a given search system, to a parameter that affects which search results are returned for a query, and/or the order in which the search results are ordered (e.g., for display to a user). The content of a search query (e.g., "John Doe Baseball"), is thus an example of a search parameter. Additionally, "relevancy parameters" (that is, parameters that are used by a search system to order search results) are also search parameters within the context of this disclosure. The boost values for name, occupation, location, and the freshness parameter in the embodiment discussed above are exemplary relevancy parameters. "Search parameter" is thus an umbrella term that covers search terms, relevancy parameters, and other parameters used by a search system during a search, such as the "Fuzzy" parameter described above.

Figure 6:
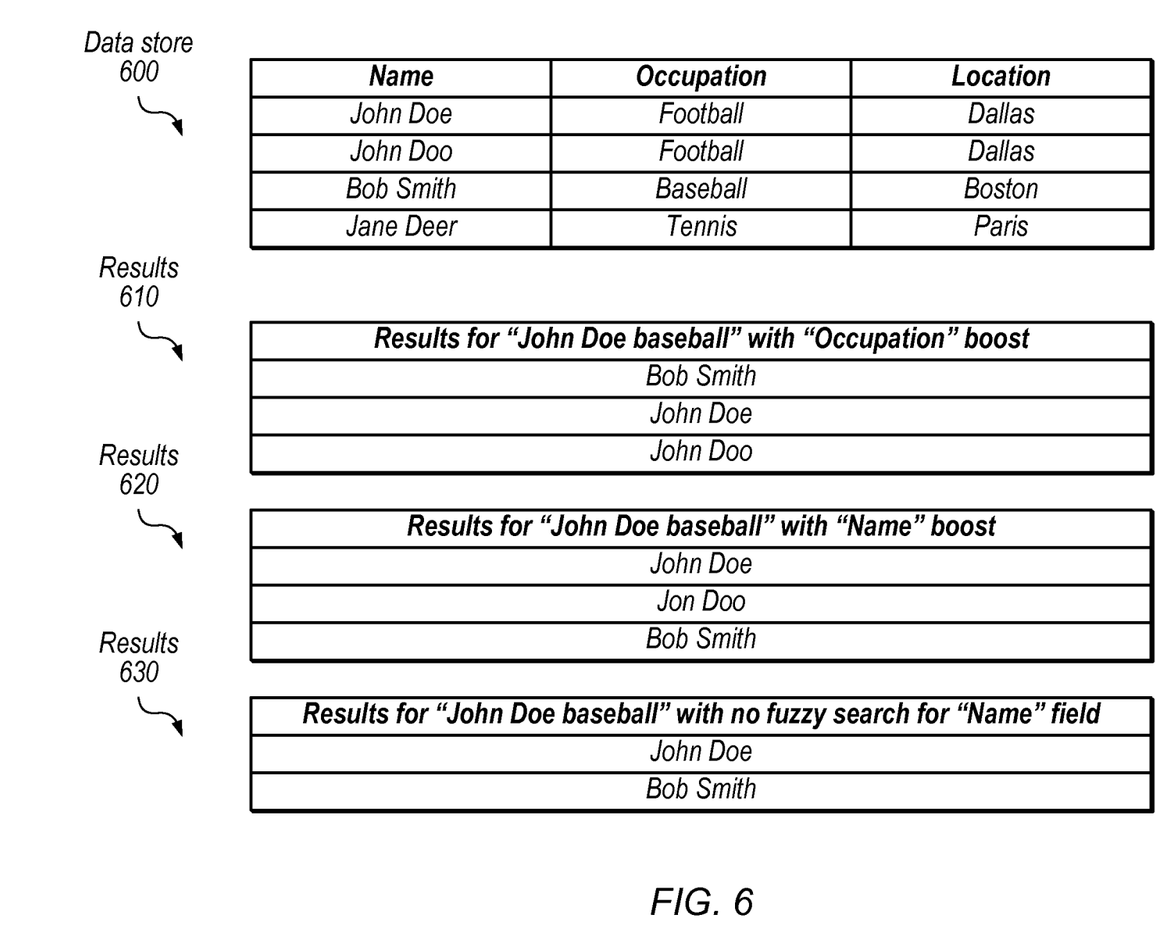
FIG. 6 is a diagram illustrating exemplary query results and orderings based on different search parameters, according to some embodiments.

In some instances, for a given set of results for a given search query, a change in a relevancy parameter does not typically change the composition of the set of search results, but may affect the ordering of the set of results. (In some instances in which the set of search results is capped at a maximum number, however, a change in a relevancy parameter may well affect the composition of the set of search results.) In contrast, a change in a search query will typically change the composition of the set of returned search results. A change in a search parameter may thus affect both the set of search results and the order of these search results. Further exemplary changes in search results based on changes in search parameters are shown in FIG. 6, described in further detail below.

Further, as used herein, the term "internal search parameter" refers to a search parameter that is configurable by administrators of a given search system but is not adjustable by those performing searches using the search system (e.g., end users). Internal search parameters often include relevancy parameters. As used herein, the term "search profile" refers to a set of search parameters used for a particular search or set of searches. A search profile may be tested using the feedback dashboard before it is deployed on a system available to non-administrator users.

Figure 2:
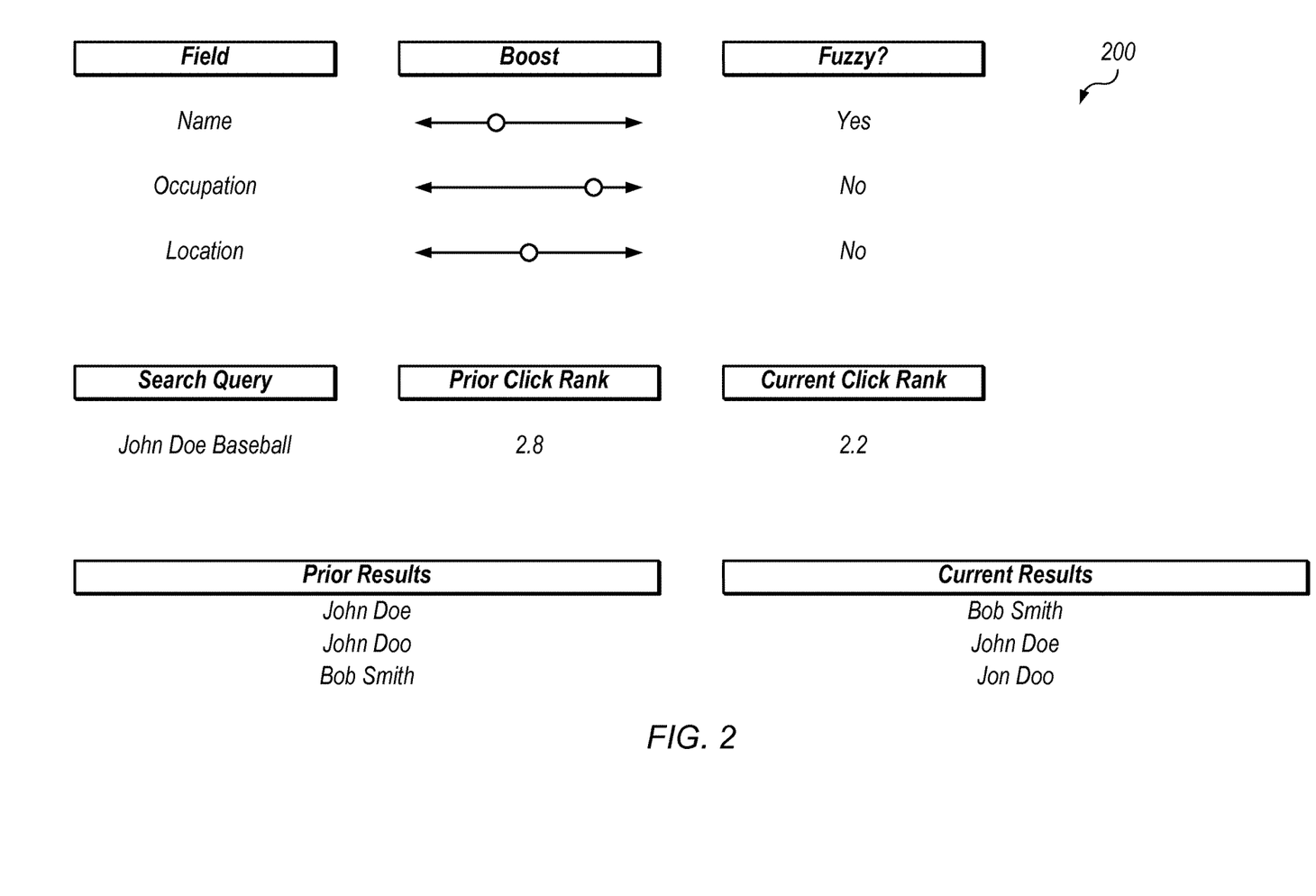
FIG. 2 is a diagram illustrating another exemplary search profile feedback dashboard, according to some embodiments.

FIG. 2 shows another view of exemplary search profile feedback dashboard 200, according to some embodiments. In the illustrated embodiment, the field, boost, fuzzy, and search query elements may be configured as described above with reference to those elements in FIG. 1. In the illustrated embodiment, the dashboard also displays search metrics ("click rank," in this embodiment) and orderings of search results both before and after changes in the search parameters. The term "search metric," as used herein in the context of search parameters, is intended to be construed according to its well-understood meaning in the art, including a measurable characteristic of results returned by a search system that uses the search parameters. Examples of search metrics include, without limitation: click rank, mean reciprocal rank, number of unique searches, number of search exits, time spent on a search site after search, number of pages viewed after search, etc.

Consider, for example, a situation in which the user has decreased the boost parameter for the name field and increased it for the occupation field. In the illustrated example, John Smith was the highest-ranked result prior to this change, but as a result of the change, Bob Smith is now the highest-ranked result. Showing the prior search results as well as the current search results thus allows a user to not only determine the ordering of search results based on changed parameters, but also quickly determine differences between the old search result ordering and the new search result ordering.

As used herein, "click rank" refers to the ranking of one or more query results that are selected (e.g., clicked on) by one or more users in an ordering of search results. For example, consider the following ordering of returned results:
Result A
Result B
Result C
Result D
If the user accesses Result B before any other displayed result, the click rank for that search is 2. Generally, a click rank nearer to 1 indicates well-tuned relevancy parameters because it indicates that more relevant results are being displayed first. It would be undesirable, for example, for a search system to have an average click rank of 25. Such a click rank would suggest that the most relevant search results are not being ordered properly (i.e., near the top of the search results). There are many variations of the click rank metric. In addition to the single-query click rank discussed above that measures the first results that is accessed, click rank may be measure over time, over different users, over multiple queries, etc. For instance, in the example above, if the user selected both Result B (second result) and Result D (fourth result) in the above ordering, the average click rank for that user and query may be 3. The average click rank for all users who run the query in a given time period may be another value, e.g., 2.3.

In the example of FIG. 2, the click rank is shown as having changed from 2.8 to 2.2 for the search query in response to a change in relevancy parameters. Based on this information, the user (e.g., a search system administrator) may determine that the change is desirable and should be deployed to a production search system. Alternately, the user could determine that further experimenting with the relevancy parameters is warranted.

In some embodiments, the dashboard may display the updated click rank without waiting for new searches to be performed using the adjusted parameters. Instead, in some embodiments, the dashboard may use prior user searches and determine what the click rank would have been if the results had been ordered using the updated relevancy parameters. In the illustrated example, selections of Bob for past searches would have had a click rank of 1, if the new relevancy parameters had been used. In the illustrated embodiment, the current click rank is computed as an average of this information for multiple past searches.

In the illustrated embodiment, click rank is determined based on changes in relevancy parameters and/or changes to fuzzy matching settings. In other embodiments, any of the disclosed visual indicators or disclosed information may be generated based on changes in other search parameters. For example, a change in a setting to enable or disable type-ahead or to change a type-ahead algorithm may cause a change in displayed results sets and/or metrics. Type-ahead refers to functionality in which additional search terms are suggested in response to a user beginning to type a search string. For example, if the user types "where can I" the type-ahead function may suggest "find a good restaurant" and/or "see a concert." As another example, adding a new field to a database may cause a change in displayed results sets and/or metrics. In some embodiments, metric information based on these changes may not be immediately available via the dashboard (e.g., this information may be determined using future searches rather than past search information), in which case the dashboard may be configured to notify the user when this information has been determined (e.g., via an email, screen-pop, text message, or any appropriate type of notification).

Note that although the illustrated change in parameters in FIG. 2 was beneficial to click rank for the search query, it may have a negative impact on click rank and/or other search metrics for other queries. Therefore, in some embodiments, the dashboard may provide information regarding impact on other queries.

Exemplary Process for Determining Impact on Other Queries

Figure 3:
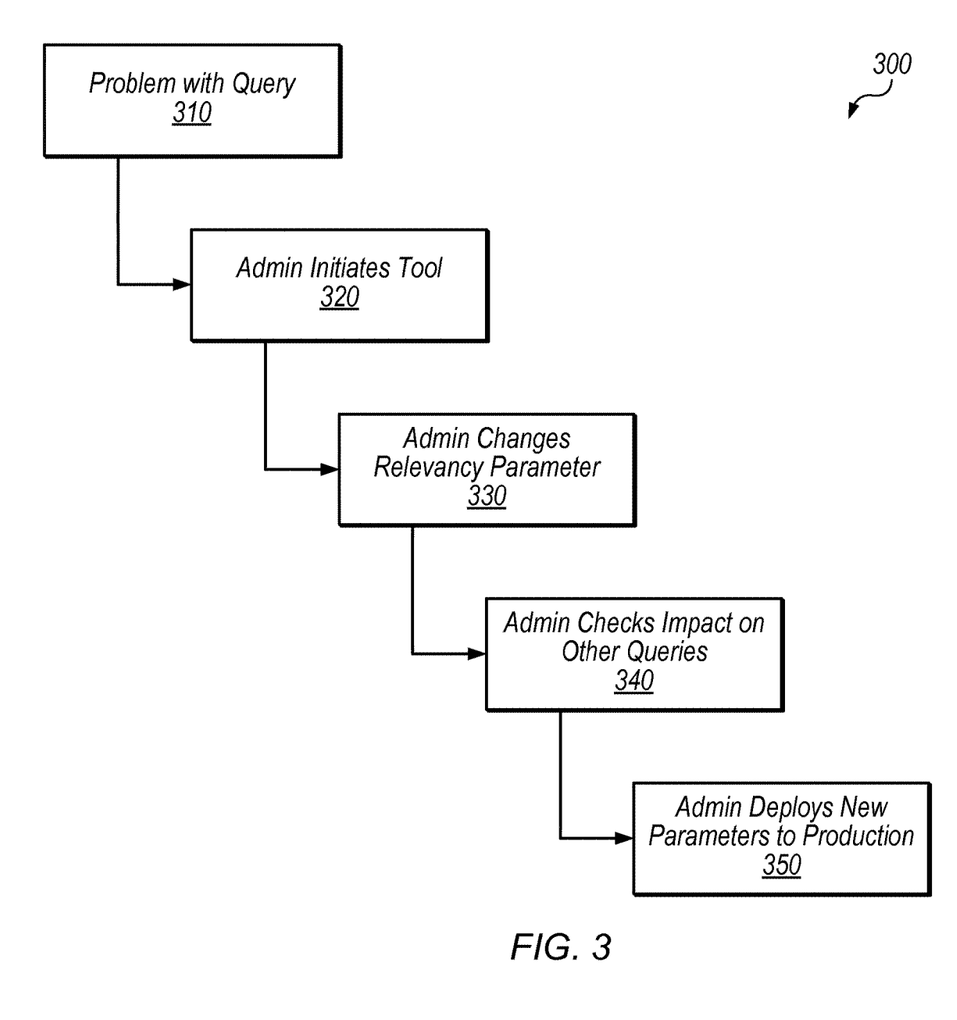
FIG. 3 is a flow diagram illustrating an exemplary high-level method for deploying a search profile, according to some embodiments.

FIG. 3 shows a high-level flow diagram 300 for adjusting survey parameters according to some embodiments. At 310, there is a problem with a query. For example, a user may report a problem (e.g., being unable to find an expected result near the top of returned search results), a click rank for the query may fall below a threshold, etc.

At 320, an administrator initiates a tool (e.g., the dashboard of FIG. 2). The administrator may specify the particular problematic query and view current query results. For example, the administrator may find the expected query result on a later page of query results rather than on the first page as desired.

At 330, the administrator changes relevancy parameters for the query. For example, the administrator may boost a freshness parameter such that recently-changed results are preferentially displayed or may boost a particular search field. At this point, the dashboard may display the updated results for the particular query.

At 340, the administrator checks the impact of the change on other queries. If the impact is undesirable, the administrator may further tune the relevancy parameters and/or other search parameters. At 350, once the administrator is satisfied, the administrator deploys a search profile that includes the new parameters to a production search system (e.g., a system available to various users for performing searches rather than a development or dashboard system). At this point, the new parameters may be used for subsequent searches on the search system. This process may allow the administrator to avoid changes in relevancy parameters that will negatively impact other searches.

Exemplary Search System and Exemplary Displayed Metrics

Figure 4:
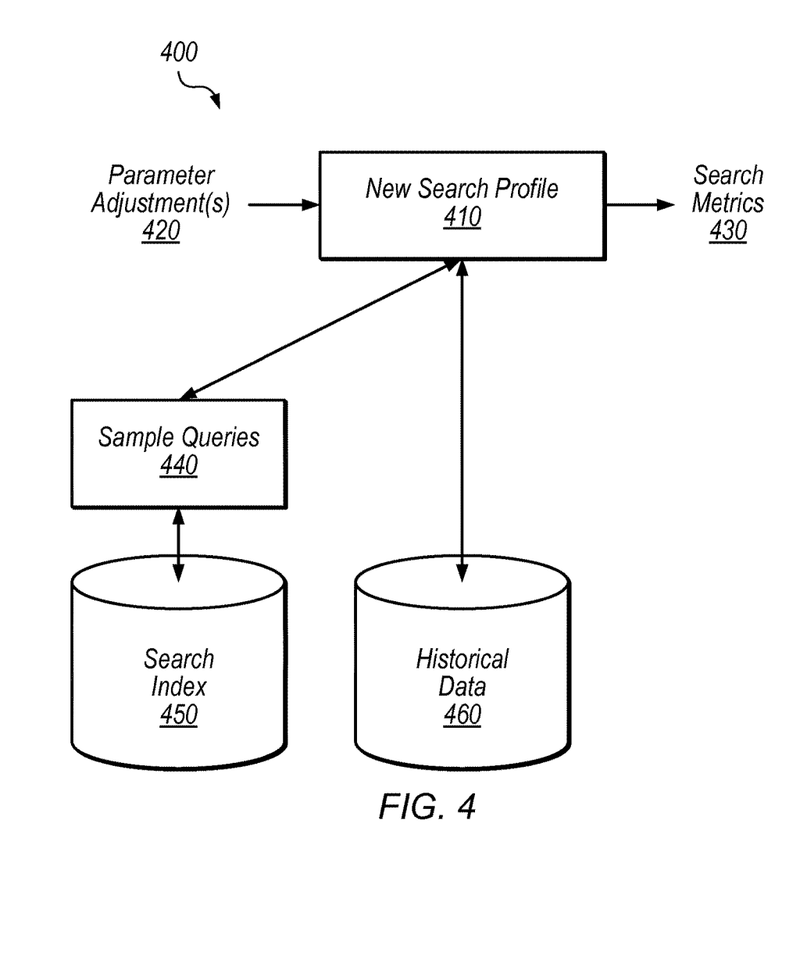
FIG. 4 is a block diagram illustrating elements of an exemplary search system according to some embodiments.

FIG. 4 shows a system 400 that includes elements for determining impact of changed search parameters on different search queries, according to some embodiments. The elements of FIG. 4 may be stored or implemented by a search system such as that shown in FIG. 5C, discussed in further detail below. In the illustrated embodiment, system 400 includes a search index 450 and historical data 460. In the illustrated embodiment, system 400 is configured to store sample queries 440. In response to parameter adjustment(s) 420, system 400 is configured to test a new search profile 410 and generate search metrics 430.

Sample queries 440, in some embodiments, are used to determine search metrics 430 based on parameter adjustments. Sample queries 440 may be manually selected by the administrator, e.g., to represent key search topics. In some embodiments, sample queries 440 may be automatically selected without explicit user input, e.g., by selecting a set of most popular searches. In some embodiments, the number of sample queries 440 is set (e.g., by an administrator) to be small enough to generate search metrics 430 fairly quickly, but large enough to provide representative data for prior searches.

Search index 450, in the illustrated embodiment, may index information in a data store being searched to facilitate performances of sample queries 440, e.g., to determine the ordering of search results using the new search profile 410. Indexing is a well-known technique to improve the speed of information retrieval by avoiding a scan of each data file, for example. Search index 450 may be included in a data store being searched or may be separate from a data store being searched.

Historical data 460, in the illustrated embodiment, stores information regarding past performance of sample queries 440. This information may include, for example, orderings of results for the queries using prior search profiles and click ranks of selected results within those orderings for past searches. Based on this information, in some embodiments, system 400 is configured to determine adjusted click ranks and/or other metrics for the new search profile.

Click rank is provided as one exemplary search metric, but various other metrics such as mean reciprocal rank, etc. may be determined in other embodiments in addition to and/or in place of click rank. "Reciprocal rank" refers to the multiplicative inverse of the rank of the first correct answer in a list of possible query results. The "correctness" of an answer may be determined in various ways. In some embodiments, for example, a result is correct when a user selects it, and mean reciprocal rank may be related to click rank in these embodiments. "Mean reciprocal rank" refers to an average of reciprocal ranks of results for a set of queries. In various embodiments, mean reciprocal rank may be determined using similar techniques to those disclosed for click rank (e.g., using past search data to determine mean reciprocal rank based on adjusted search parameters, without actually performing new searches). Other exemplary search metrics include, without limitation: a metric relating to whether a given number of top clicked results show up in a new tuning and a normalized discounted cumulative gain metric.

Figure 5A:
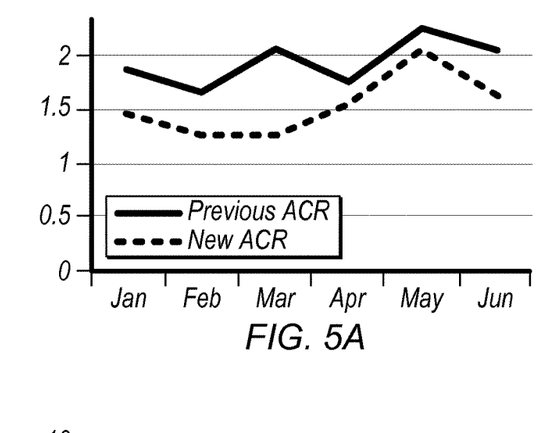
FIGS. 5A and 5B are diagrams illustrating exemplary graphics for displaying search metrics based on changes in search parameters, according to some embodiments.

FIG. 5A shows a chart of average click rank (ACR) over time for previous and new search parameters, according to some embodiments. In the illustrated example, click rank is averaged over the entire set of sample queries 440 for each month. In some embodiments, the feedback dashboard is configured to display such information in real-time as the user adjusts search parameters. In the illustrated example, average click rank improved for every displayed month based on the change in search parameters. Based on this information, a user would likely proceed with deploying the new search parameters. Note that average click rank may be determined, in some embodiments, for any of various appropriate sets of data with various restrictions. For example, click rank may be averaged over a particular set of users (or all users), over a particular set of queries, over a particular time interval (or an entire history of a particular search system), etc.

Figure 5B:
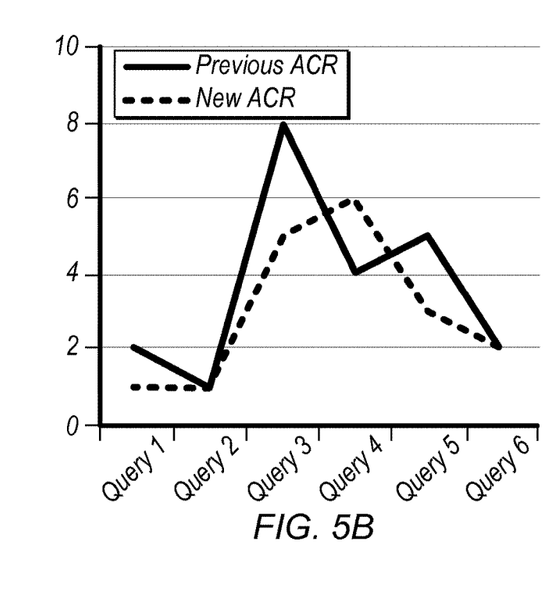

FIG. 5B shows a chart of ACR for previous and new search parameters for specific queries 1-6. In some embodiments, the feedback dashboard is configured to display such information in real-time as the user adjusts search parameters. In the illustrated example, average click rank improved for queries 1, 3, and 5 and degraded for query 4.

Figure 5C:
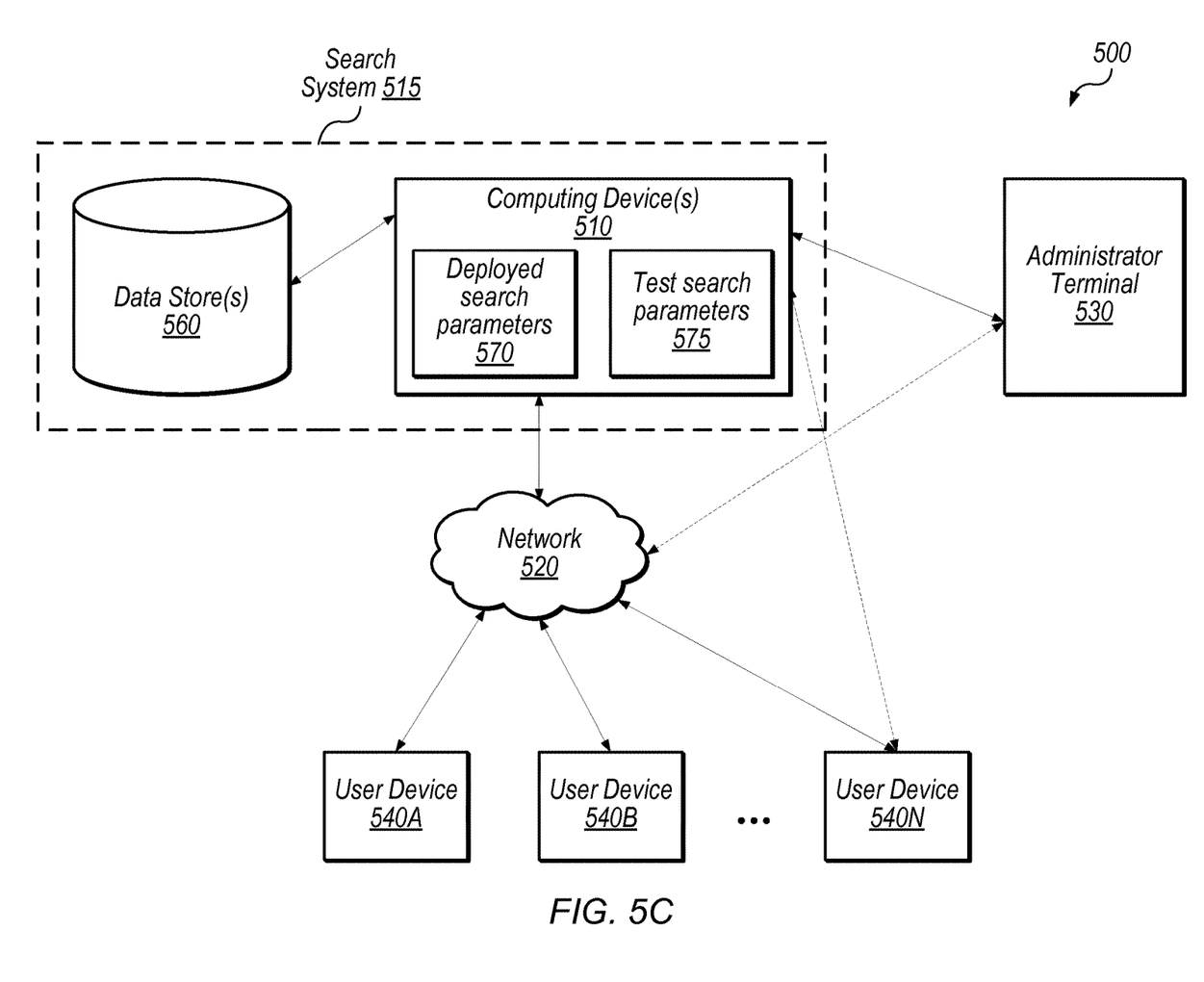
FIG. 5C is a block diagram illustrating an exemplary search system according to some embodiments.

FIG. 5C shows a system 500 that includes an exemplary search system 515, according to some embodiments. In the illustrated embodiment, search system 515 includes computing device(s) 510 and data store(s) 560.

Computing device(s) 510, in the illustrated embodiment, are coupled to administrator terminal 530 and user devices 540A-N (which may also be referred to collectively as user devices 540). Computing device(s) 510 may be coupled to these administrator terminal 530 and ones of user devices 540 via network 520 or directly, in various embodiments. The connections may be wired or wireless. Administrator terminal 530 may be a display device coupled directly to computing device(s) 510 or may be coupled to a separate computing device.

Data store(s) 560, in some embodiments, includes sample queries 440, search index 450, one or more search profiles with various search parameters, historical data 460, data being searched, and/or other information, etc.

Computing device(s) 510, in some embodiments, are configured to generate the feedback dashboard and cause it to be displayed on administrator terminal 530. In the illustrated embodiment, computing device(s) 510 are configured to store both deployed search parameters 570 and test search parameters 575. In response to adjustments in search parameters by a user of administrator terminal 530, the computing device(s) 510 may store the adjustments as test search parameters 575. Based on the adjustments, computing device(s) 510 may be configured to generate various metrics and/or orderings of results described herein for the feedback dashboard. At this point, prior to deployment of the adjusted searched parameters, searches by the users devices 540 continue to use deployed search parameters 570 (having values prior to the adjustments), in some embodiments. Thus, prior to deployment, the adjusted parameters may be stored as test search parameters 575 and used only for searches performed to generate information for the feedback dashboard. Once the administrator has deployed the adjusted search parameters, however, the adjusted parameters are used for searches by user devices 540. Deployment of the adjusted search parameters may involve copying test search parameters 575 to a storage location of deployed search parameters 570 or otherwise indicating that the test search parameters 575 are to be used for searches from user devices 540, for example.

User devices 540 may be configured to perform various searches of various types, including searching a full-text index representing the content of a database, for example. User devices may include, without limitation, personal computers, mobile devices, wearable devices, server systems, etc. In some embodiments, deployed search parameters 570 and test search parameters 575 are internal search parameters that are configurable by administrator terminal 530 (e.g., based on an authentication procedure) but are not configurable to user devices 540.

The exemplary techniques described herein may improve the functioning of search system 515 by allowing administrators to determine the impact of changes in search parameters before deploying those changes. This may prevent, for example, negative impacts on other queries or on search metrics such as average click rank. Instead, the techniques allow an administrator to detect and avoid these negative impacts before deploying adjusted search parameters. These improvements to search technology may reduce the time between search profile adjustments and deployment (e.g., by reducing testing time for administrators before they can safely deploy a new search profile) and improve the relevancy of search results provided to users, in some embodiments. The improved relevancy of search results may thus lead to more efficient retrieval of data by users of devices 540.

FIG. 6 provides further exemplary search results based on adjusted search parameters. In the illustrated embodiment, data store 600 includes four entries, each with name, occupation, and location fields. Results 610 correspond to the results shown in FIG. 1, based on a boost to the occupation field. Results 620 correspond to a boost in the name field. As shown, John Doe and Jon Doo are now ranked more highly because they match the name field. In some embodiments, fuzzy matches may be weighted more or less highly than exact matches, and this weight may correspond to another adjustable relevancy parameter (in contrast to the parameter that indicates whether fuzzy logic is used for a field at all, which is a search parameter). Results 630 correspond to a removal of the fuzzy search option for the name field. Based on this change, Jon Doo is no longer returned. Similar changes in various parameters (e.g., the weight factor for matches in the displayed location field), freshness parameters (e.g., weighting results based on how recently they were added or updated), etc. may be used in various embodiments using various algorithms for determining relevancy based on the relevancy parameters. The particular examples in FIG. 6 are shown to facilitate explanation and not to limit the scope of the present disclosure.

Exemplary Methods

Figure 7:
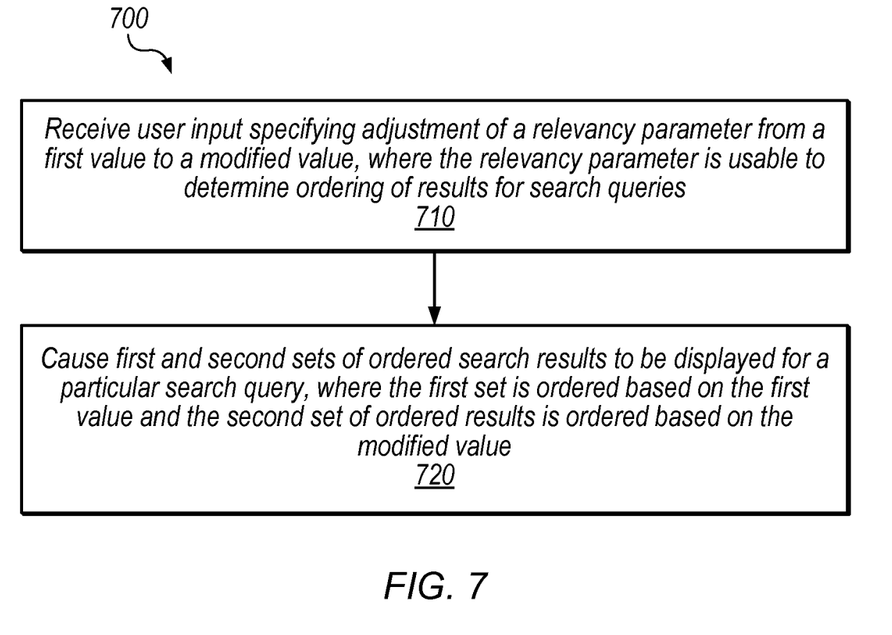
FIG. 7 is a flow diagram illustrating a method for displaying ordered search results based on an adjusted relevancy parameter, according to some embodiments.

FIG. 7 shows a flow diagram illustrating one exemplary embodiment of a method 700 for displaying ordered search results based on an adjusted relevancy parameter. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, user input is received specifying adjustment of a relevancy parameter from a first value to a modified value. For example, the user may use one of the sliding graphics elements of FIG. 1 or FIG. 2 (or any appropriate graphics element or text field) to adjust a boost parameter for a particular database field or for some other data store attribute (e.g., freshness). In the illustrated embodiment, the relevancy parameter is usable to determine ordering of results for search queries. In some embodiments, the user may adjust multiple relevancy parameters. Flow proceeds to block 720.

At block 720, first and second sets of ordered search results are caused to be displayed for a particular search query. The particular search query may be user-selected, pre-selected by an administrator or a computing system, determined according to some criterion (e.g., a most-commonly-used query), etc. In the illustrated embodiment, the first set is ordered based on the first value of the relevancy parameter and the second set is ordered based on the modified value. In some embodiments, the two sets are displayed side-by-side, allowing the user to easily determine differences between the sets of results based on the change in the relevancy parameter(s). In some embodiments, the first set of results include saved results from a prior search (e.g., in historical data 460). In other embodiments, the first set of results is determined by performing the search query using the first value of the relevancy parameter. In some embodiments, the second set of results is determined by performing the search query using the adjusted value of the relevancy parameter. The query may be performed, however, using a test search system of the dashboard rather than a production search system. Flow ends at block 720.

Figure 8:
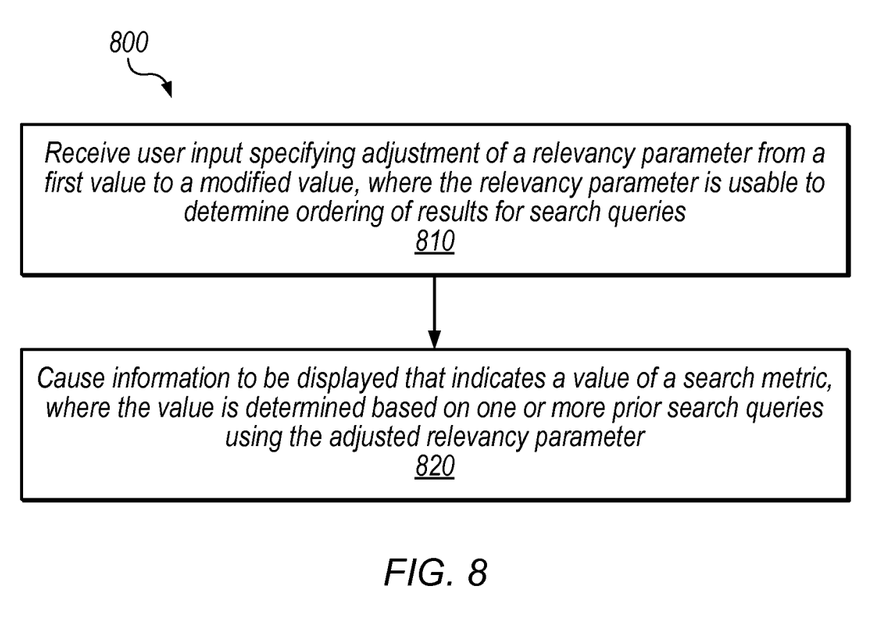
FIG. 8 is a flow diagram illustrating a method for displaying search metric information based on an adjusted relevancy parameter, according to some embodiments.

FIG. 8 shows a flow diagram illustrating one exemplary embodiment of a method 800 for displaying search metric information based on an adjusted relevancy parameter. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 810.

At block 810, user input is received specifying adjustment of a relevancy parameter from a first value to a modified value. For example, the user may use one of the sliding graphics elements of FIG. 1 or FIG. 2 (or any appropriate graphics element or text field) to adjust a boost parameter for a particular database field or for some other data store attribute (e.g., freshness). In the illustrated embodiment, the relevancy parameter is usable to determine ordering of results for search queries. In some embodiments, the user may adjust multiple relevancy parameters. Flow proceeds to block 820.

At block 820, information that indicates the value of a search metric is caused to be displayed. In this embodiment, the value of the search metric is determined based on one or more prior search queries using the adjusted relevancy parameter. For example, using the adjusted relevancy parameter, the dashboard may determine what click rank would have been for the prior search queries, had the adjusted relevancy parameter been implemented, based on historical data 460. In some embodiments, the dashboard is configured to determine the value of the metric without re-performing the prior searches. In some embodiments, the value is an average value of the metric over time for a particular set of searches. In some embodiments, the value is an average value of the metric for particular queries. In some embodiments, the dashboard is also configured to display a previous value of the metric (e.g., based on the first value of the relevancy parameter) and/or a difference between the previous value of the metric and the value of the metric that is based on the adjusted relevancy parameter.

The exemplary methods of FIGS. 7-8 utilize adjusted relevancy parameters, but in other embodiments, similar methods may be performed for changes in other types of search parameters. The use of relevancy parameters in exemplary disclosed embodiments is not intended to limit the scope of the present disclosure.

Exemplary Computing Device

Figure 9:
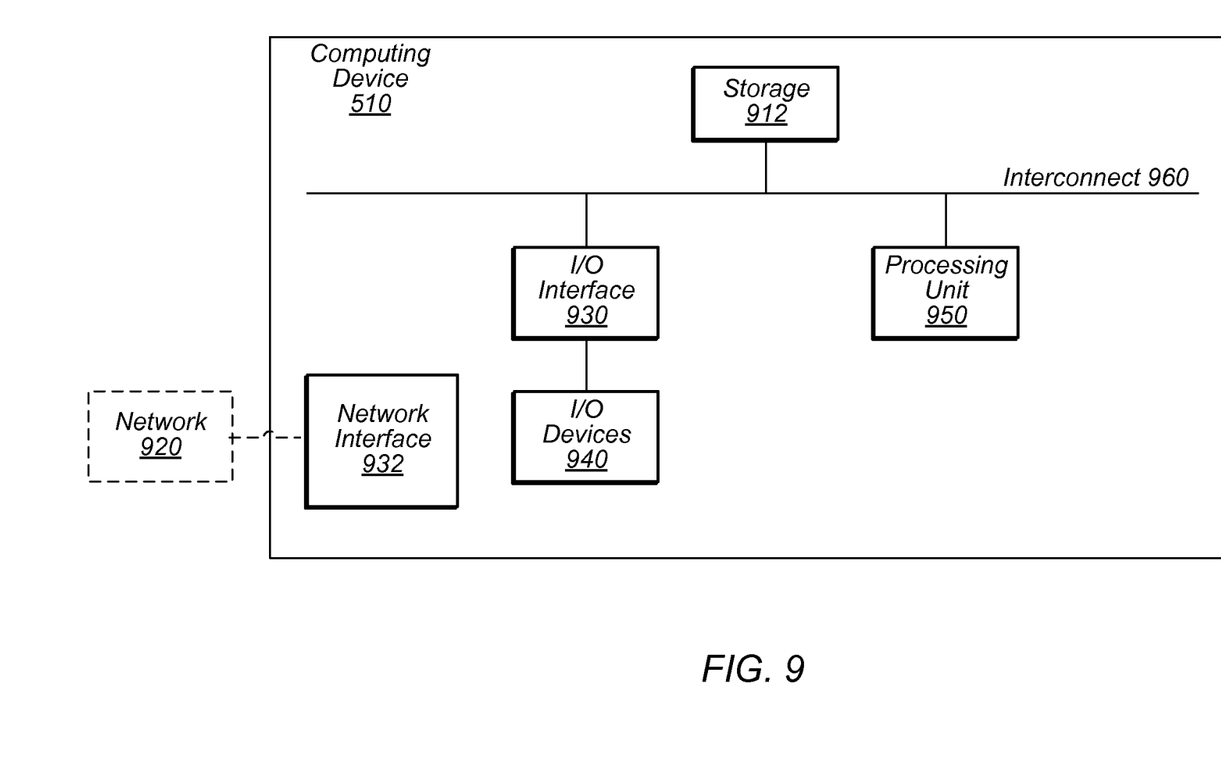
FIG. 9 is a block diagram illustrating a computing device, according to some embodiments.

Turning now to FIG. 9, a block diagram of a computing device (which may also be referred to as a computing system) 910 is depicted, according to some embodiments. Computing device 910 may be used to implement various portions of this disclosure, such as the causing embodiments of the feedback dashboard to be displayed, for example. Computing device 910 is one example of a device that may be used for computing device(s) 510, administrator terminal 530, and/or user devices 540, for example.

Computing device 910 may be any suitable type of device, including, but not limited to, a personal computer system, desktop computer, laptop or notebook computer, mobile phone, mainframe computer system, web server, workstation, or network computer. As shown, computing device 910 includes processing unit 950, storage 912, input/output (I/O) interface 930 coupled via an interconnect 960 (e.g., a system bus). I/O interface 930 may be coupled to one or more I/O devices 940. Computing device 910 further includes network interface 932, which may be coupled to network 920 for communications with, for example, other computing devices.

As described above, processing unit 950 includes one or more processors. In some embodiments, processing unit 950 includes one or more coprocessor units. In some embodiments, multiple instances of processing unit 950 may be coupled to interconnect 960. Processing unit 950 (or each processor within 950) may contain a cache or other form of on-board memory. In some embodiments, processing unit 950 may be implemented as a general-purpose processing unit, and in other embodiments it may be implemented as a special purpose processing unit (e.g., an ASIC). In general, computing system 910 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions from any suitable form of non-transitory computer-readable media to perform specified operations.

Storage subsystem 912 is usable by processing unit 950 (e.g., to store instructions executable by and data used by processing unit 950). Storage subsystem 920 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 912 may consist solely of volatile memory in some embodiments. Storage subsystem 912 may store program instructions executable by computing device 910 using processing unit 950, including program instructions executable to cause computing device 910 to implement the various techniques disclosed herein.

In some embodiments, storage subsystem 912 may include one or more data stores to be searched. In some embodiments, one or more data stores may be multi-tenant (MT) databases. Exemplary MT database embodiments are described in U.S. Pat. No. 7,779,039, filed Apr. 2, 2004 and titled "Custom entities and fields in a multi-tenant database system." In these embodiments, different tenants may maintain different search profiles with various different search parameters, and different tenants may separately utilize embodiments of the feedback dashboard. In some embodiments, the disclosed techniques may be utilized in cloud computing environments in which computing services or resources are deployed on centralized data storage and access via a network such as the Internet. In various embodiments, the database(s) being searched may be stored on a different computing device or computing system than the computing device used to generate the feedback dashboard. In these embodiments, the different computing devices/systems may communicate via network 920, for example.

I/O interface 930 may represent one or more interfaces and may be any of various types of interfaces configured to couple to and communicate with other devices, according to various embodiments. In some embodiments, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having instructions stored thereon that are executable by a computing device to perform operations comprising:

receiving, via an administrator user interface of a search system, user input specifying adjustment of an internal relevancy parameter, wherein the internal relevancy parameter is not adjustable via a search user interface of the search system that accepts input from users performing search queries, and wherein the relevancy parameter is usable by a search system to determine ordering of results for search queries such that different values of the relevancy parameter result in different result orderings for a query with a given set of search terms;

accessing data associated with one or more prior search queries that were performed via the search user interface and re-performing the one or more prior search queries using the same set of search terms for each of the one or more prior search queries, wherein the re-performing is initiated without explicit user input requesting the re-performing, using the adjusted relevancy parameter instead of a prior relevancy parameter such that an ordering of results for the re-performing is different than an initial ordering of results for the one or more prior search queries;

determining a value of a search metric based on: the ordering of results for the re-performed one or more prior search queries and prior user interaction with the initial ordering of results, wherein the search metric is a click rank metric; and causing information to be displayed that indicates the value of the search metric for the adjusted relevancy parameter.

2. The non-transitory computer-readable medium of claim 1, wherein the click rank metric is average click rank.

3. The non-transitory computer-readable medium of claim 1, wherein the re-performing is performed on a same set of data being searched as the one or more prior search queries.

4. The non-transitory computer-readable medium of claim 1, wherein the operations further comprise:

in response to the receiving, causing information to be displayed that indicates a value of the search metric prior to the adjustment of the relevancy parameter.

5. The non-transitory computer-readable medium of claim 1, wherein the operations further comprise:
   storing search information from the one or more past searches that is usable to determine the value of the search metric using the adjusted relevancy parameter.

6. A system, comprising:
   one or more processors; and
   one or more memories having program instructions stored thereon that are executable by the one or more processors to perform operations comprising:
      receiving, via an administrator user interface of a search system, user input specifying adjustment of an internal relevancy parameter, wherein the internal relevancy parameter is not adjustable via a search user interface of the search system that accepts input from users performing search queries, and wherein the relevancy parameter is usable by a search system to determine ordering of results for search queries such that different values of the relevancy parameter result in different result orderings for a query with a given set of search terms; and
      accessing data associated with one or more prior search queries that were performed via the search user interface and re-performing the one or more prior search queries using the same set of search terms for each of the one or more prior search queries, wherein the re-performing is initiated without explicit user input requesting the re-performing, using the adjusted relevancy parameter instead of a prior relevancy parameter such that an ordering of results for the re-performing is different than an initial ordering of results for the one or more prior search queries;
      determining a value of a search metric based on: the ordering of results for the re-performed one or more prior search queries and prior user interaction with the initial ordering of results, wherein the search metric is a click rank metric; and
      causing information to be displayed that indicates the value of the search metric for the adjusted relevancy parameter.

7. The system of claim 6, wherein the operations further comprise causing information to be displayed that indicates a change in the value of the search metric based on adjustment of the relevancy parameter.

8. The system of claim 6, wherein the click rank metric is an average click rank.

9. The system of claim 6, wherein the operations further comprise deploying the adjusted relevancy parameter on a search system.

10. The system of claim 6, further comprising determining a mean reciprocal rank based on: the ordering of results for the re-performed one or more prior search queries and prior user interaction with the initial ordering of results.

11. The system of claim 6, wherein the operations further comprise displaying past values of the search metric over time.

12. The system of claim 6, wherein the internal relevancy parameter is a fuzzy logic parameter.

13. A method, comprising:
   receiving, by a computing system via an administrator user interface of a search system, user input specifying adjustment of an internal relevancy parameter, wherein the internal relevancy parameter is not adjustable via a search user interface of the search system that accepts input from users performing search queries, and wherein the relevancy parameter is usable by a search system to determine ordering of results for search queries such that different values of the relevancy parameter result in different result orderings for a query with a given set of search terms;
   accessing, by the computing system, data associated with one or more prior search queries that were performed via the search user interface and re-performing the one or more prior search queries using the same set of search terms for each of the one or more prior search queries, wherein the re-performing is initiated without explicit user input requesting the re-performing, using the adjusted relevancy parameter instead of a prior relevancy parameter such that an ordering of results for the re-performing is different than an initial ordering of results for the one or more prior search queries;
   determining, by the computing system, a value of a search metric based on: the ordering of results for the re-performed one or more prior search queries and prior user interaction with the initial ordering of results, wherein the search metric is a click rank metric; and
   causing, by the computing system, information to be displayed that indicates the value of the search metric for the adjusted relevancy parameter.

14. The method of claim 13, further comprising deploying the adjusted relevancy parameter on a search system.

15. The method of claim 13, further comprising displaying past values of the search metric over time.

16. The method of claim 13, further comprising causing information to be displayed that indicates a change in the value of the search metric based on adjustment of the relevancy parameter.

* * * * *